United States Patent
Harvell

(10) Patent No.: US 11,722,531 B2
(45) Date of Patent: *Aug. 8, 2023

(54) POLICY-CONTROLLED COMPUTING BASED ON CONNECTION OF REMOTE ACCESS SYSTEM

(71) Applicant: Netskope, Inc., Santa Clara, CA (US)

(72) Inventor: Bradley B. Harvell, Gilbert, AZ (US)

(73) Assignee: Netskope, Inc., Santa Clara, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 17/318,950

(22) Filed: May 12, 2021

(65) Prior Publication Data

US 2022/0094719 A1    Mar. 24, 2022

Related U.S. Application Data

(63) Continuation of application No. 17/028,682, filed on Sep. 22, 2020, now Pat. No. 11,019,106.

(51) Int. Cl.
*H04L 9/40* (2022.01)
*G06F 9/455* (2018.01)
*H04L 41/0893* (2022.01)

(52) U.S. Cl.
CPC ........ *H04L 63/205* (2013.01); *G06F 9/45558* (2013.01); *H04L 41/0893* (2013.01); *H04L 63/029* (2013.01); *G06F 2009/45587* (2013.01); *G06F 2009/45595* (2013.01)

(58) Field of Classification Search
CPC . H04L 63/205; H04L 41/0893; H04L 63/029; H04L 41/0894; H04L 63/102; H04L 63/20; H04L 63/0272; G06F 9/45558; G06F 2009/45587; G06F 2009/45595; G06F 9/452

See application file for complete search history.

(56) References Cited

U.S. PATENT DOCUMENTS

| | | |
|---|---|---|
| 8,347,350 B2 | 1/2013 | Lum |
| 8,560,709 B1 | 10/2013 | Shokhor |
| 9,270,765 B2 | 2/2016 | Narayanaswamy |
| 10,140,430 B1 | 11/2018 | Taralika |
| 10,257,184 B1 * | 4/2019 | Mehta ............... H04L 67/306 |
| 10,291,657 B2 | 5/2019 | Narayanaswamy |
| 11,115,387 B2 | 9/2021 | Bosch |

(Continued)

FOREIGN PATENT DOCUMENTS

| | | |
|---|---|---|
| AU | 2019202203 A1 | 4/2019 |
| CN | 101242261 B | 8/2008 |

(Continued)

*Primary Examiner* — Mohammad W Reza
(74) *Attorney, Agent, or Firm* — Mughal Gaudry & Franklin PC

(57) ABSTRACT

A remote access system for policy-controlled computing with a client device connected to a remote software environment is disclosed. The client device communicates with the remote software environment that securely runs applications. Restrictions for a local application that runs on the client device are enforced using a first plurality of policies based on whether the client device is connected to a specific Virtual Private Network (VPN). A mid-link server enforces restrictions on the remote software environment using a second plurality of policies.

20 Claims, 4 Drawing Sheets

(56) References Cited

U.S. PATENT DOCUMENTS

| | | | |
|---|---|---|---|
| 2003/0081621 A1* | 5/2003 | Godfrey | H04L 67/564 |
| | | | 370/400 |
| 2010/0064341 A1 | 3/2010 | Aldera | |
| 2011/0093602 A1 | 4/2011 | Coskun | |
| 2013/0054962 A1 | 2/2013 | Chawla | |
| 2014/0040978 A1 | 2/2014 | Barton | |
| 2014/0280889 A1* | 9/2014 | Nispel | H04L 63/029 |
| | | | 709/224 |
| 2015/0133082 A1 | 5/2015 | Broch | |
| 2015/0281277 A1 | 10/2015 | May | |
| 2016/0359909 A1 | 12/2016 | Dorfman | |
| 2017/0180428 A1 | 6/2017 | May | |
| 2019/0036845 A1* | 1/2019 | Gong | H04L 12/46 |

FOREIGN PATENT DOCUMENTS

| | | |
|---|---|---|
| CN | 101355557 A | 1/2009 |
| JP | 2006262131 A | 9/2006 |
| JP | 2013257897 A | 12/2013 |
| JP | 2016036079 A | 3/2016 |

\* cited by examiner

POLICY-CONTROLLED COMPUTING BASED ON CONNECTION OF REMOTE ACCESS SYSTEM

CROSS-REFERENCES TO RELATED APPLICATIONS

This application is a continuation of U.S. application Ser. No. 17/028,682 entitled "REMOTELY ACCESSED CONTROLLED CONTAINED ENVIRONMENT," filed on Sep. 22, 2020, the contents of which is incorporated by reference in its entirety for all purposes.

BACKGROUND

This disclosure relates in general to remote access to networks with security and, but not by way of limitation, to remote access to a computer amongst other things.

The modern trend is to have a distributed work force or even have employees work at home. Within the enterprise, security is easier to enforce with everyone being co-located on the same local area network (LAN). As employees connect to services and sites from outside the LAN, security and control is more difficult to maintain.

Many enterprises have a bring your own device policy that allows different platforms, operating systems, and application versions to run with the workplace systems. Maintaining security in these circumstances is nearly impossible because of the number of unique systems and software builds that need to be supported. Each has their own unique set of risk factors and information technology (IT) staff cannot keep ahead of threats.

SUMMARY

In one embodiment, the present disclosure provides a remote access system for policy-controlled computing with a client device connected to a remote software environment is disclosed. The client device communicates with the remote software environment that securely runs applications. Restrictions for a local application that runs on the client device are enforced using a first plurality of policies based on whether the client device is connected to a specific Virtual Private Network (VPN). A mid-link server enforces restrictions on the remote software environment using a second plurality of policies.

In an embodiment, a remote access system for policy-controlled computing with a client device connected to a remote software environment is disclosed. The remote access system includes a local action, a mid-link server, and a mirror function. The local application is configured to execute on the client device. The local application includes a first policy component with a first plurality of policies and a client endpoint coupled to a digitally segregated tunnel. The first plurality of policies specify restrictions for the local application based on whether the client device is connected to a specific Virtual Private Network (VPN). The mid-link server is coupled to the digitally segregated tunnel. The mid-link server includes a mid-link endpoint that terminates the digitally segregated tunnel, an operating system and a plurality of applications running on the operating system, and a second policy component. The second policy component uses a second plurality of policies with the remote software environment. The mirror function emulates sensor input from the client device as if it is happening inside the remote software environment.

In another embodiment, a method for policy-controlled computing with a client device connected to a remote software environment is disclosed. Restrictions for a local application are enforced with a first policy component having a first plurality of policies based on whether the client device is connected to a specific Virtual Private Network (VPN). The first policy component is part of the local application configured to execute on the client device. A digitally segregated tunnel is provisioned between a client endpoint and a mid-link endpoint of a mid-link server. An operating system and a plurality of applications running on the operating system that collectively are port of the remote software environment are provisioned on the mid-link server. Restrictions are enforced on the remote software environment with a second policy component using a second plurality of policies. Sensor input from the client device is emulated as if it is happening inside the remote software environment using a mirror function.

In still another embodiment, a remote access system for policy-controlled computing with a client device connected to a remote software environment is disclosed The remote access system comprising a plurality of servers, collectively having code for: enforcing restrictions for a local application with a first policy component having a first plurality of policies based on whether the client device is connected to a specific Virtual Private Network (VPN), wherein the first policy component is part of the local application configured to execute on the client device; provisioning a digitally segregated tunnel between a client endpoint and a mid-link endpoint of a mid-link server; provisioning on the mid-link server an operating system and a plurality of applications running on the operating system that collectively are port of the remote software environment; enforcing restrictions on the remote software environment with a second policy component using a second plurality of policies; and emulating sensor input from the client device as if it is happening inside the remote software environment using a mirror function Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
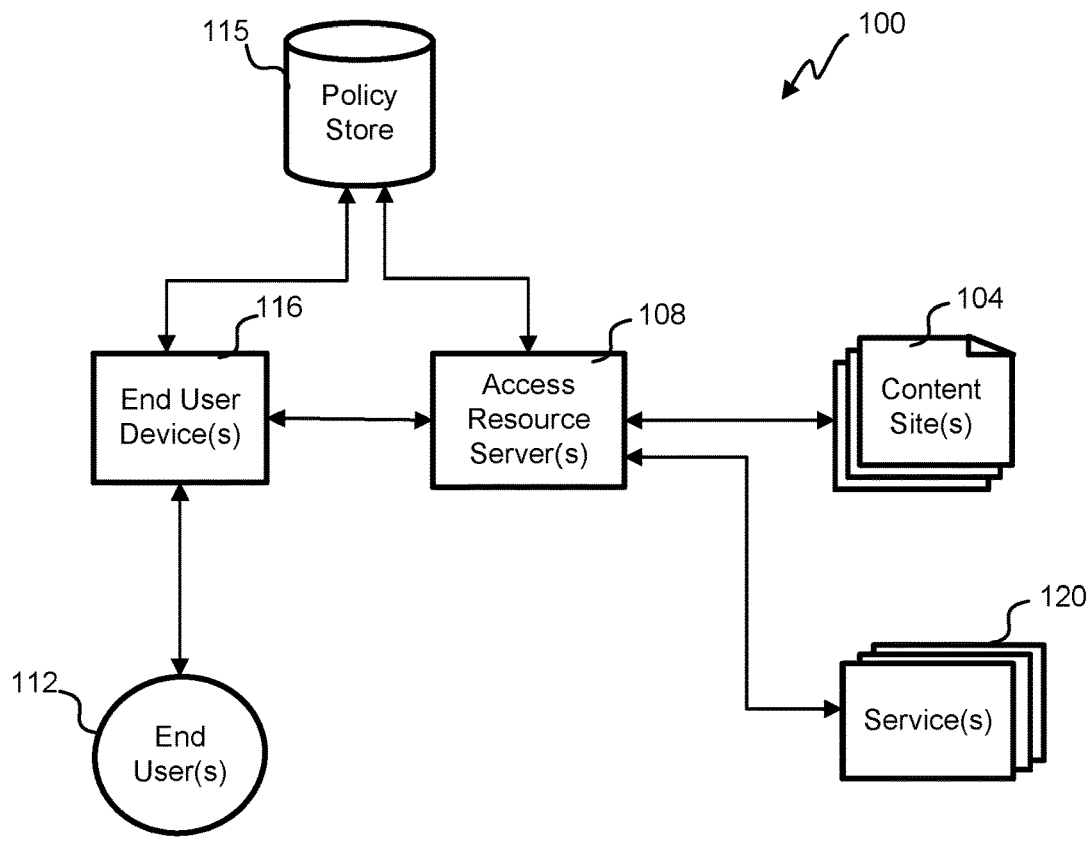
FIG. 1 depicts a block diagram of an embodiment of a remote access system.

Referring first to FIG. 1 a block diagram of an embodiment of a remote access system 100 is shown. End user device(s) 116 such as smartphones, tablets, PCs, and any other computers can be secured by using an access resource server (ARS) that remotely hosts the software environment that is secured. End user devices 116 can run on any popular operating system (OS) such as Windows™, iOS™, Android™, Linux, set top box OSes, and Chromebook™. The third party apps are applications running on the operating system of the end user devices 116. A policy store 115 holds policies for each end user device 116 and each ARS 108.

The end user devices 116 use content and processing from content sites 104 (e.g., web sites, streaming content, etc.) and services 120 (e.g., SaaS tools, databases, cloud service providers, etc.). Under policy control, the end user device 116 routes some interaction to the ARS 108 who hosts a controlled software environment for each end user 112 to more securely interact with content sites 104 and services 120 or enterprise tools in a way limited by specified policies. For example, policies may specify what applications can be running on the end user device 116 while using the controlled software environment by remote access. Policies control what information can be stored, printed, saved, forwarded or otherwise captured on the end user device 116. Other policies may allow certain software or interaction on the end user device 116 while physically on premise while allowing different software or interaction while working in the field or at home away from the enterprise premises. In one example policy on the end user device, cut-and-paste to/from the remote software environment may be disabled for some or all applications when accessed from the end user device 116. In some cases, enforcement of the policy will depend on whether the end user device 116 is within the enterprise or away from the office.

The ARS 108 is also called a mid-link server meaning that for work systems, the ARS 108 sits as a "man-in-the-middle" intentionally take over some or all: processing, application execution and/or content sites 104 and services 120 interaction. The remote software environment is hosted by the ARS 108 for a policy-controlled experience using the policy store 115 for direction. For example, content sites 104 can have certain features disabled, filtered or modified by the ARS 108 so that the end user devices behaves than if it were to directly connect to the content site 104. For example personally identifiable information adhering to European regulation is a selectable policy that would filter or obscure that from display or capture. Some embodiments have policies that selectively direct traffic to the ARS 108 based upon whether it is done during work hours or not or using a work account or not. For example, in the evenings using a personal YouTube™ account, the end user 112 may have unfettered access with the ability to leave comments on a video. During work hours and/or using a work account, the same end user 112 would be prevented from leaving comments at that same content site 104.

Figure 2A:
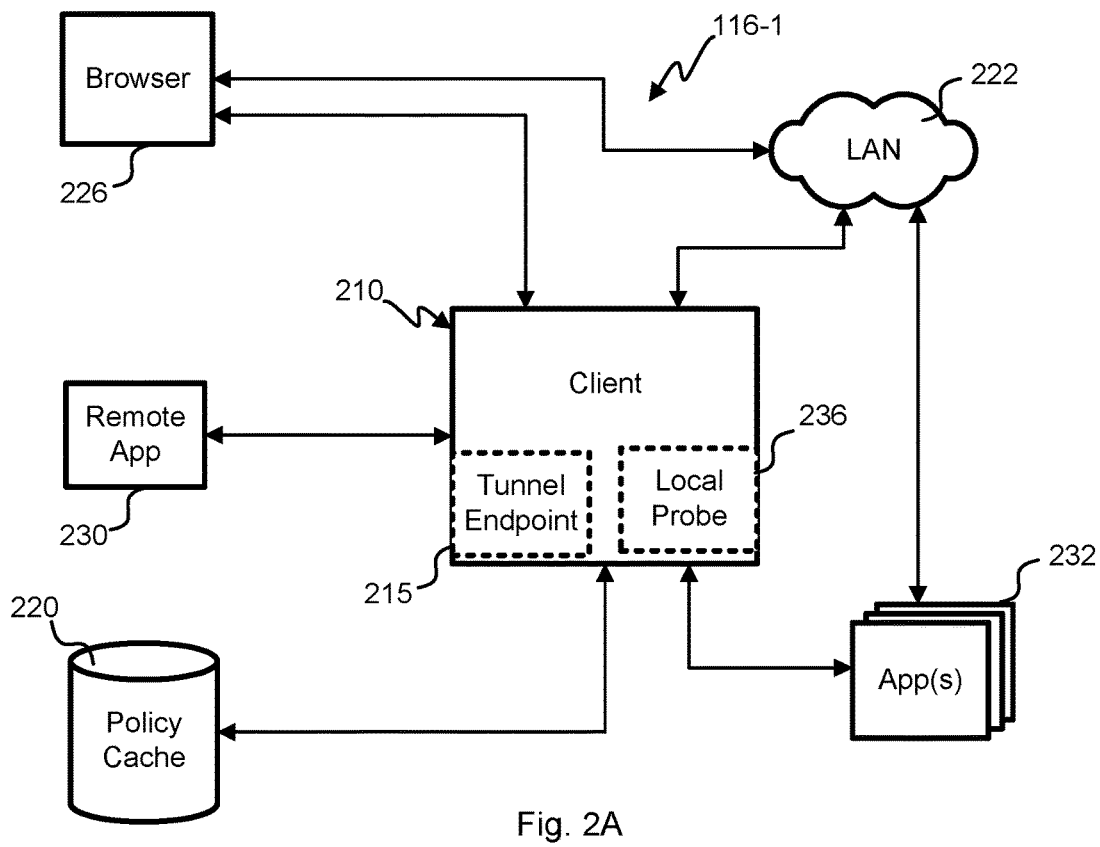
FIGS. 2A-2C depict block diagrams of embodiments of an end user device.
Figure 2B:
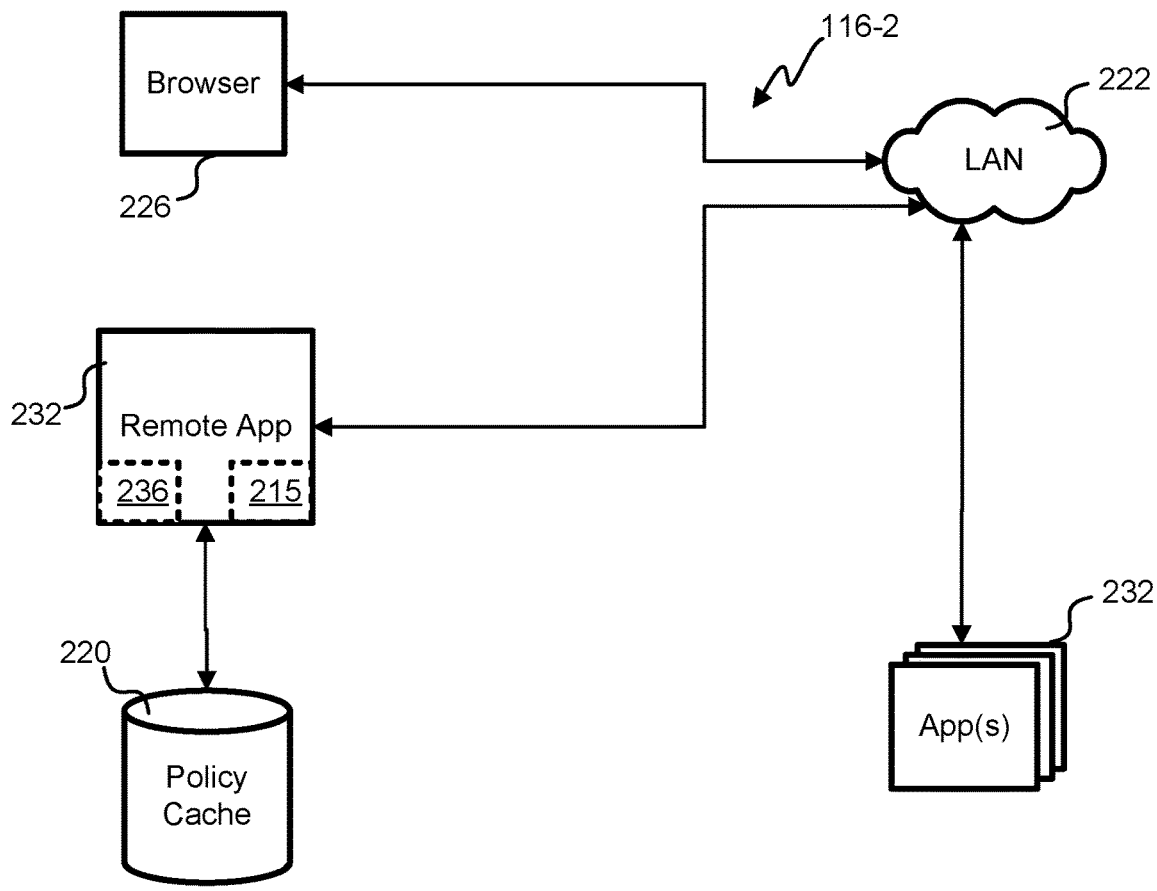
Figure 2C:
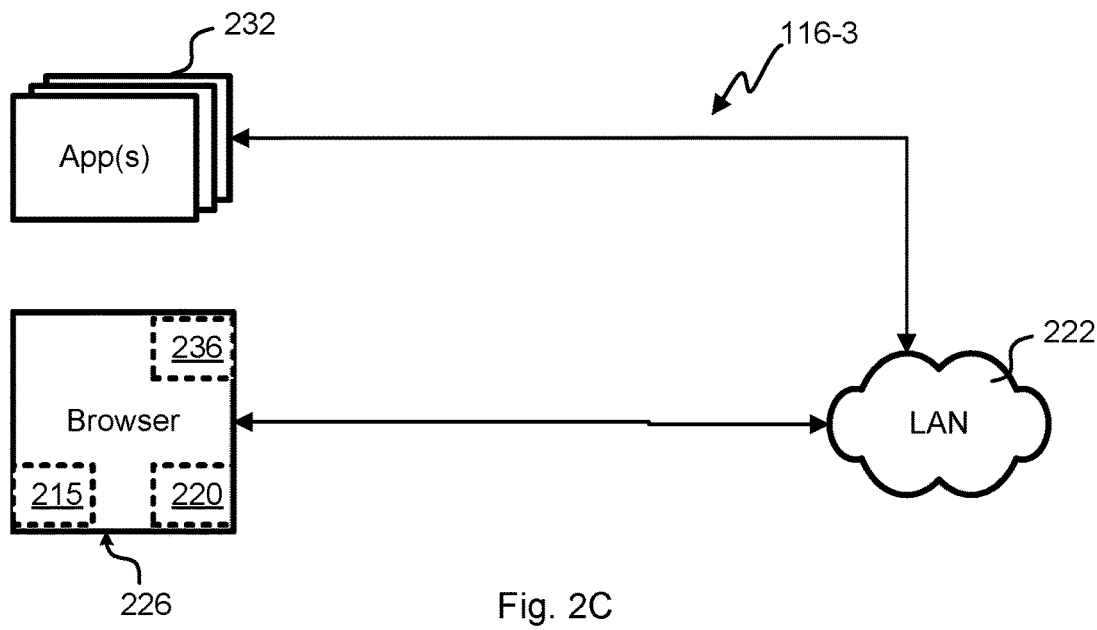

With reference to FIG. 2A-2C, block diagrams of embodiments of an end user device 116 are shown. A remote app 232 provides an interface that mirrors the software environment on the ARS 108. A policy cache 220 holds the subset of policies from the policy store 115 that are intended for a particular end user device 116. Some embodiments could forgo a policy cache 220 altogether and query the remote policy store 115 as needed in real time. The policies could prohibit certain programs from running or disable certain features while the remote app 232 is being used, for example, key logging software or screen capture features could be disabled by a client 210. The policies could control what data can be entered/scanned/input or leave, be printed/displayed, or be stored outside of the ARS 208.

A local area network (LAN) 222 serves the physical location of the end user device(s) 116 even though that may be temporary with the mobility of these end user devices 116. The LAN connects to the Internet using a gateway and/or router typically to communicate over a wide area. Some policies from the policy cache 220 may be specific to a particular LAN 222, location, work hours, or other condition/criteria. For example, use of USB drives may be prohibited while connected to the LAN 222 directly or through a VPN to avoid possible theft of trade secrets or other confidential information.

The end user device 116 has a browser 226 and apps 232 running and creating potential security issues. Especially with 'bring your own device' policies, maintaining security with unknown apps 232 running is problematic. Sometimes, the browser 226 and apps 232 will route some traffic of the end user device 116 to the client to use the ARS 108 and apply local and/or mid-link policies upon digital packet data travelling within the LAN 222 or externally to the Internet.

Referring specifically to FIG. 2A, this embodiment of an end user device 116-1 uses a client 210 to funnel digital traffic to the ARS 108. A remote app 230 exclusively uses the client to communicate with the ARS 108 to maintain security for operation of the remote app 230. An endpoint tunnel 215 digitally segregates the traffic using protocols and/or encryption to avoid interception over the LAN 222 and Internet. Certain embodiments could use the SSL/TLS and/or HTTPS or a VPN to secure the endpoint tunnel 215.

Display of the remote software environment is performed by the remote app 230. The whole interface of the remote software environment could be displayed or the interface of a single remote app. Several instances of the remote app 230 could display several remote app interfaces respectively. Multiple instances of the remote app 230 could have several remote software environments respectively running. For example, a user of Chromebook™ may have one remote app 230 running iOS™ and another remote app 230 running Linux™ with the ability to switch back-and-forth in full-screen or windowed mode. The remote app 230 is a browser or video player in some embodiments merely displaying a stream of video and gathering information with the local probe 236 to provide information needed by the remote software environment.

A local probe 236 in the client 210 gathers information about the end user device 116-1, such as user input (keyboard, mouse, touch screen, touchpad, gestures, haptic feedback, etc.), sensor information (trilateration location, compass, gyro, accelerometer, ambient light, video, camera, 3D movement detection, sound, sound arrays, temperature, etc.), and software environment (clock set time, time zone, installed or running apps 232, power status, battery status, app permissions, app settings, etc.). The local probe 236 gathers all information possible by the particular OS, computer hardware, OSI layer, or elsewhere to allow mimicry of those conditions at the software environment hosted on the ARS 108 for the end user device 116-1. For example, the video camera on a phone end user device 116 could be used by the software environment running iOS to participate in a video conference even when the user device 116 cannot natively support that video conference software.

The client 210 can apply policies that are stored locally in a policy cache 220 to the end user device 116. The policy cache 220 is populated with policies from the policy store 115 that are relevant for the end user device 116. As conditions change, the policies that are in effect could also change. For example, the camera/video sensors on the phone end user device could be disabled inside the office or factory, but re-enabled outside of a geofenced area. Certain features, functions or applications might be disabled by policy until certain conditions exist. For example, there may be a policy that: requires a recent anti-virus scan prior to allowing connection to the LAN 222, doesn't allow certain programs to be installed, prevents emails to certain address(es), etc.

This embodiment includes an endpoint tunnel 215 in the client 210. The endpoint tunnel 215 digitally separates packet traffic between the end user device 116 and the ARS 108. There may be a number of endpoint tunnels 215 in operation simultaneously to support the remote app 230, any apps 232 or browser 226 communication with the ARS 108. A virtual private network (VPN) connection, HTTPS connection, and/or public or private key encryption can be used for the endpoint tunnel 215 for different connections.

With reference to the embodiment of FIG. 2B, an end user device 116-2 is shown that does not include the client 210 of the embodiment of FIG. 2A. The remote app 232 includes one or more endpoint tunnels 215 that connect with the ARS 108. The remote app 232 also has code to understand policies from the policy cache 220. The remote probe 236 is embedded in the remote app 232 and as such may be limited in the information that can be gathered from within the application layer.

Referring next to FIG. 2C, an end user device 116-3 includes a browser 226 that has integral policy cache 220, endpoint tunnel 215, and remote probe 236. The browser 226 can download a remote function that links to the software environment on the ARS 108. The remote function at run time loads in the code to create a policy cache 220, endpoint tunnel 215, and remote probe 236. The ARS 108 may provide the remote function or another cloud or hosting provider.

Each policy cache 220 gathers the relevant policies from the policy store 115 for each instance within the browser. Instead of using an endpoint tunnel 215, HTTPs is used to for the endpoint tunnel to the ARS 108. Some operating systems have HTTPs built directly into them for use by the browser 226. Other embodiments, could use a VPN function in the operating system or downloaded to the web page to formulate an endpoint tunnel 215 to convey traffic to the ARS 108.

Figure 3:
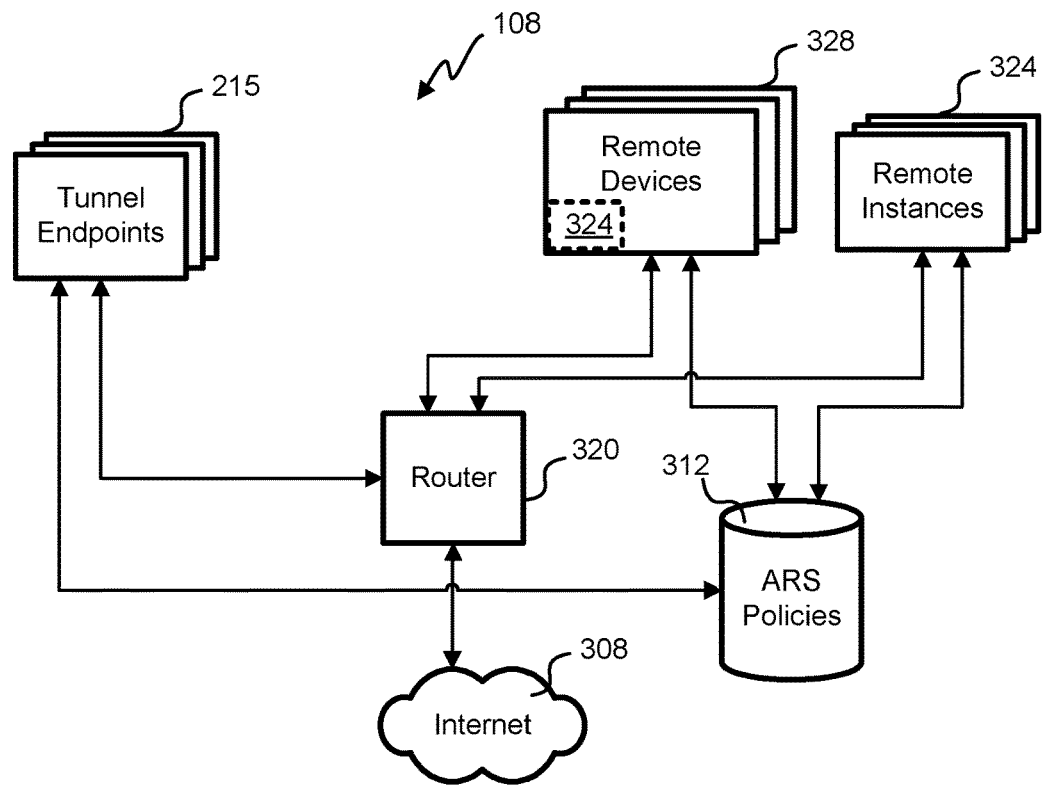
FIG. 3 depicts a block diagram of an embodiment of an access resource server (ARS)

Referring next to FIG. 3, an embodiment of an ARS 108 is shown that hosts the software environments that end user devices 116 remote into. Traffic is passed with the Internet accessed through a router 320 to allow the various depicted components of the ARS 108 to communicate with each other, specifically, tunnel endpoints 215, ARS policies 312, remote devices 328, and remote instances 324.

The ARS 108 can host many different enterprises and domains keeping usage from their different end user devices 116 separated. In other cases, the ARS 108 could be dedicated to a particular enterprise and hosted inside their network or LAN 222 or with a third party hosting service. In any event, each remote instance 324 is dedicated to an end user device 116 for use, although information technology (IT) staff have access to update software, make configuration changes, modify admin settings and rights, etc. to maintain the remote instance 324. The tunnel endpoints 215 connect with end user devices 116 over the Internet 308 in digitally segregated connections.

Both physical remote devices 328 and virtual-machine remote instances 324 are supported to run software environments. For example, the physical remote devices 328 could be tablets, smartphones, personal computers (Mac or PC), Chromebooks™, Linux™ servers, kiosks, or any personal computing device that employees might use. Any operating system running in a virtual machine on a physical device is supported to allow any enterprise to have their software environments running in a more secure, more controlled and potentially higher performance instantiations.

The remote devices 328 are physical hardware that hosts a remote instance 324 and is dedicated to the end user device 116 currently connected to the ARS 108. Not all operating systems allow running in a development mode or as a virtual machine to support all the functionality of a remote instance. For those situations, the operating system is running on a physical device temporarily dedicated to the end user device 116 with software to allow the end user to control the remote instance 324.

ARS policies 312 include keys, required protocols, quality of service, authentication requirements for the end user devices 116, other requirements for the end user devices 116. For example, the tunnel endpoint 215 may not connect with end user devices 116 that have a modified HTTP stack that wouldn't have the same level of trust as one built into the operating system. ARS policies 312 are distributed from the policy store 115 and updated for each end user device 116, their enterprise, their country, present location of the end user device 116, etc.

Figure 4:
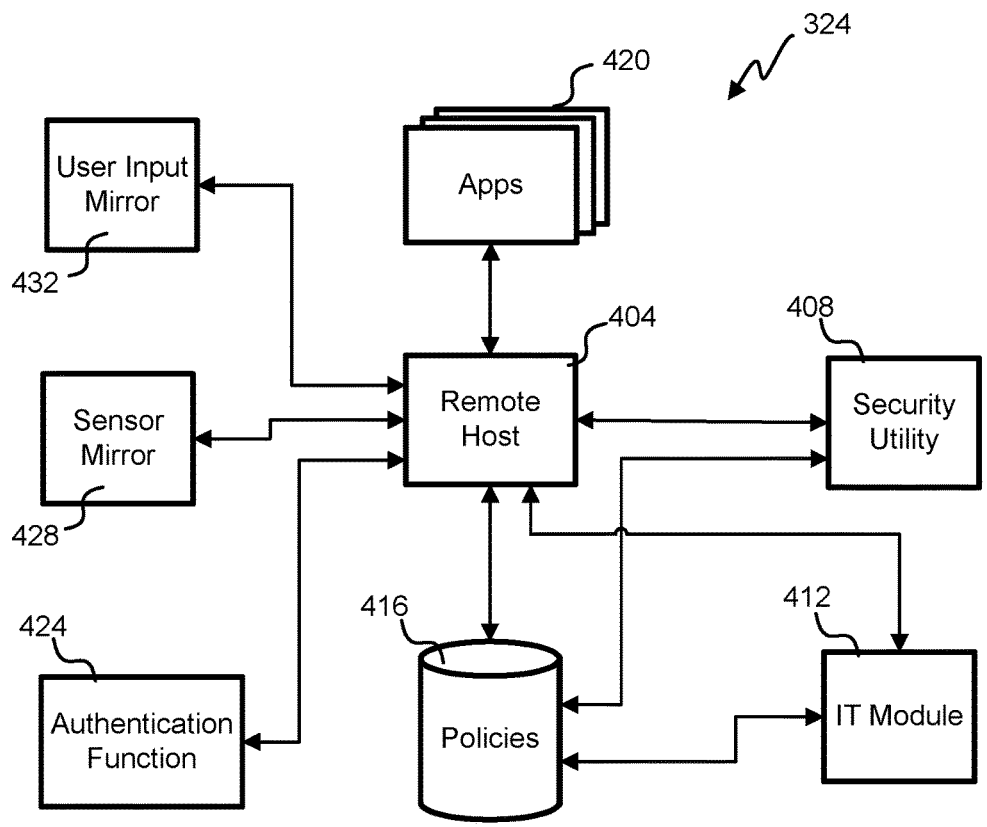
FIG. 4 depicts a block diagram of an embodiment of a remote software environment.

With reference to FIG. 4, a block diagram of an embodiments of a remote instance 324 is shown that provides a remote software environment to an end user device 116. Included in the remote instance 324 are a remote host 404, policies 416, an authentication function 424, a sensor mirror 428, a user input mirror 432, a customizable selection of apps 420, a security utility 408, and an IT module 412. A given enterprise or domain can specify and configure the apps 420 and policies 416 to control the software environment for each employee or according to the title or group the employee. The remote host 404 uses a software or hardware processor to run the apps 420 and other functions of the remote instance 324.

The remote app 230 or browser 226 connects to the remote instance 324 to mirror the software environment to the end user device 116. The software environment can run full screen or in a window to occupy only part of the screen on the end user device 116. For example, the end user 112 may own an Android™ phone, but her employer uses iOS™ phones as remote devices 328. Phone calls would happen normally from the local phone, but the remote software environment would occupy the full screen of the local phone to benefit from the policies and security of the ARS 108 to appear as if iOS™ were running on the Android™ phone.

Some embodiments could have a policy that requires the end user device 116 to run the software environment in full-screen mode and/or lock out certain apps from running on the end user device 116 while connected to the software environment.

The authentication function 424 is used to log the end user 112 into the software environment. After authentication, the end user device 116 is authorized to load the remote instance 324. Some embodiments may use the credentials to encrypt the digital tunnel between the end user device 116 and the ARS 108. Biometric readers on the end user device 116 may be used by the authentication function 424 at initial login or periodically to confirm continued authorization.

The security utility 408 maintains security for the remote instance 324. Virus, worm and other hacking or unauthorized activity detection is performed by the security utility 408. Some policies could specify security necessary before use of the remote instance 423, for continued use of the remote instances 324, and prior to loading of certain apps 420. Where there is a security issue detected by the security utility 408 the remote instance 324 can be locked down with the end user 112 logged out, or a fresh remote instance 324 could be loaded without the security issue.

The IT module 412 allows remote or local technical support for the remote instance 324. IT professionals can remote into the software environment to provide technical support, upgrade software or otherwise perform maintenance. Some embodiments do not allow IT support remotely by policy such that IT assistance is only possible while physically connected to the remote instance 324 and/or within the same LAN.

The user input mirror 432 takes all remote interaction by the end user 112 and injects that into the remote instance 324 as if the activity were local. The local probe 236 on the end user device 116 gathers this information and sends it to the user input mirror 432 with low latency to provide a lag-free end user experience. For example, a gesture on an Android™ device is translated to the equivalent by the user input mirror 432 for the remote instance. In this way, a software environment could support any use input regardless of whether there is native support on the remote instance 324.

The sensor mirror 424 also gathers information from the local probe 236. Any sensor data on the end user device 116 is spoofed by the sensor mirror 424 to make the software environment think that sensor data was for the remote instance 324. For example, a video conferencing app 420 could use the video camera for the end user device 116 after the sensor mirror 424 spoofs the video camera sensor to appear as if it is local to the remote instance 324.

Figure 5:
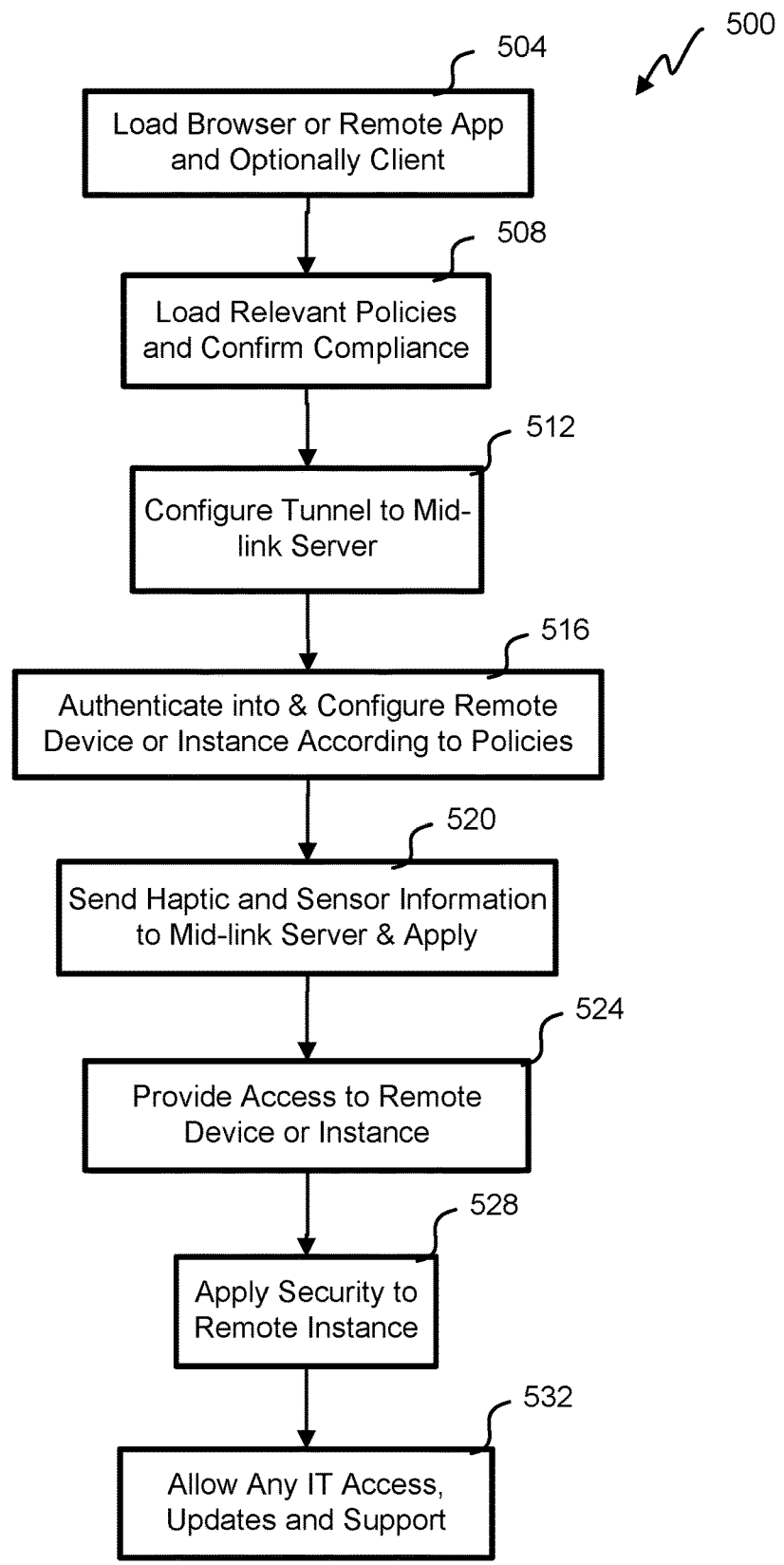
FIG. 5 illustrates a flowchart of an embodiment of a policy-controlled process for secure computing with a client device connected to a remote software environment.

Referring nest to FIG. 5, a flowchart of an embodiment of a policy-controlled process 500 for secure computing with the end user device 116 connected to a remote software environment. The depicted portion of the policy-controlled process 500 begins in block 504 where the end user device 116 loads either a browser 226 or remote app 230 to interact with the software environment remotely. Some embodiments have a client 210 on the end user device 116 and that is loaded also. In some cases, the browser 226 or remote app 230 will not load unless the client 210 is loaded first as required by policy.

In block 508, the policies for the end user device 116 and remote instances 324 are respectively loaded before confirming compliance. The digitally segregated tunnel between the end user device 116 and the ARS 108 is configured in block 512. The remote instance 324 is authenticated into and configured according to the policies. Once up and running, the user input and sensor information is collected by the local probe 236 and passed to the user input mirror 432 and sensor mirror 428 in block 520.

After configured, the end user 112 remotely interacts with the software environment in block 524. Any security is applied automatically by the security utility 408 in block 528 according to the policies. Any IT access and support is provided in block 532. In this way, the end user device 116 can operate any software environment with policy control even if it is a different operating system as if it were natively hosted on the end user device 116 in one embodiment.

A number of variations and modifications of the disclosed embodiments can also be used. For example, the above embodiments have policy control on both the end user device and in the ARS, but other embodiments could have policies hosted in either location. Policies in one location could affect the operation of the other location. For example, a policy on the ARS could require the client on the end user device to confirm that no key logging or screen capture software is enabled before the segregated tunnel to the remote software environment is allowed.

policies could be conditional, for example, if the end user computer is using the latest Chrome™ browser, it can be used as normal, but if they are using an older version or a different browser, the interaction is performed by the software environment using the preferred browser and displayed with the sub-optimal browser locally. The software environment can be for a single app and run several simultaneously in this way. At a given time, there may be several apps may be run on the ARS and presented locally at the same time. The remote app might load once for a remote browser and a second time for a video conference, for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A remote access system for policy-controlled computing with a client device connected to a remote software environment, the remote access system comprising:
   the client device that includes a local application configured to execute on the client device, the local application comprising:
     a first policy component with a first plurality of policies, wherein the first plurality of policies specify restrictions for the local application based on whether the client device is connected to a specific Virtual Private Network (VPN), and
     a client endpoint coupled to a digitally segregated tunnel;
   a mid-link server, coupled to the digitally segregated tunnel, the mid-link server comprising:
     a mid-link endpoint that terminates the digitally segregated tunnel,
     an operating system and a plurality of applications running on the operating system that collectively are port of the remote software environment,
     a second policy component, wherein the second policy component uses a second plurality of policies with the remote software environment, and
     a security utility that maintains security for the remote software environment by using the second plurality of policies, wherein the second plurality of policies specifies security for use of a remote instance associated with the remote software environment; and
   a mirror function that emulates sensor input from the client device as if it is happening inside the remote software environment.

2. The remote access system for policy-controlled computing with the client device connected to the remote software environment of claim 1, wherein the first plurality of policies varies based on conditions associated with the client device.

3. The remote access system for policy-controlled computing with the client device connected to the remote software environment of claim 2, wherein the conditions include a location of the client device, a time duration of connection of the client device to the VPN and/or a working profile associated with the client device, and wherein the VPN connection is associated with the location of the client device.

4. The remote access system for policy-controlled computing with the client device connected to the remote software environment of claim 3, wherein the restrictions for the local application is based on the conditions.

5. The remote access system for policy-controlled computing with the client device connected to the remote software environment of claim 1, wherein the second plurality of policies correspond to an enterprise, a country, or a present location of the client device.

6. The remote access system for policy-controlled computing with the client device connected to the remote software environment of claim 1, wherein the second plurality of policies include keys, protocols, quality of service, or authentication requirements for the client device.

7. A method for policy-controlled computing with a client device connected to a remote software environment, the method comprising:
   enforcing restrictions for a local application executed on the client device, the local application with a first policy component having a first plurality of policies based on whether the client device is connected to a specific Virtual Private Network (VPN), wherein the first policy component is part of the local application configured to execute on the client device;
   provisioning a digitally segregated tunnel between a client endpoint and a mid-link endpoint of a mid-link server;
   provisioning on the mid-link server an operating system and a plurality of applications running on the operating system that collectively are port of the remote software environment;
   enforcing restrictions on the remote software environment with a second policy component using a second plurality of policies;
   maintaining security for the remote software environment by using the second plurality of policies, wherein the second plurality of policies specifies security for use of a remote instance associated with the remote software environment; and emulating sensor input from the client device as if it is happening inside the remote software environment using a mirror function.

8. The method for policy-controlled computing with the client device connected to the remote software environment of claim 7, wherein the first plurality of policies varies based on conditions associated with the client device.

9. The method for policy-controlled computing with the client device connected to the remote software environment of claim 8, wherein 9include a location of the client device, a time duration of connection of the client device to the VPN and/or a working profile associated with the client device, and wherein the VPN connection is associated with the location of the client device.

10. The method for policy-controlled computing with the client device connected to the remote software environment of claim 9, wherein the restrictions for the local application is based on the conditions.

11. The method for policy-controlled computing with the client device connected to the remote software environment of claim 7, wherein the second plurality of policies correspond to an enterprise, a country, or a present location of the client device.

12. The method for policy-controlled computing with the client device connected to the remote software environment of claim 7, wherein the second plurality of policies include keys, protocols, quality of service, or authentication requirements for the client device.

13. A remote access system for policy-controlled computing with a client device connected to a remote software environment, the remote access system comprising a plurality of servers, collectively having code for:
 enforcing restrictions for a local application executed on the client device, the local application with a first policy component having a first plurality of policies based on whether the client device is connected to a specific Virtual Private Network (VPN), wherein the first policy component is part of the local application configured to execute on the client device;
 provisioning a digitally segregated tunnel between a client endpoint and a mid-link endpoint of a mid-link server;
 provisioning on the mid-link server an operating system and a plurality of applications running on the operating system that collectively are port of the remote software environment;
 enforcing restrictions on the remote software environment with a second policy component using a second plurality of policies;
 maintaining security for the remote software environment by using the second plurality of policies, wherein the second plurality of policies specifies security for use of a remote instance associated with the remote software environment; and
 emulating sensor input from the client device as if it is happening inside the remote software environment using a mirror function.

14. The remote access system for policy-controlled computing with the client device connected to the remote software environment of claim 13, wherein the first plurality of policies varies based on conditions associated with the client device.

15. The remote access system for policy-controlled computing with the client device connected to the remote software environment of claim 14, wherein the conditions include a location of the client device, a time duration of connection of the client device to the VPN and/or a working profile associated with the client device, and wherein the VPN connection is associated with the location of the client device.

16. The remote access system for policy-controlled computing with the client device connected to the remote software environment of claim 15, wherein the restrictions for the local application is based on the conditions.

17. The remote access system for policy-controlled computing with the client device connected to the remote software environment of claim 13, wherein the second plurality of policies correspond to an enterprise, a country, or a present location of the client device.

18. The remote access system for policy-controlled computing with the client device connected to the remote software environment of claim 13, wherein the second plurality of policies include keys, protocols, quality of service, or authentication requirements for the client device.

19. The remote access system for policy-controlled computing with the client device connected to the remote software environment of claim 13, wherein the remote software environment is a virtual environment.

20. The remote access system for policy-controlled computing with the client device connected to the remote software environment of claim 13, wherein the operating system is selected from a group consisting of: Windows™, iOS™, Android™, Linux, and Chromebook™.

* * * * *